United States Patent
Acar et al.

(10) Patent No.: US 12,289,193 B2
(45) Date of Patent: Apr. 29, 2025

(54) QUADRATURE COMMUNICATION FOR WIRELESS POWER TRANSFER

(71) Applicant: Renesas Electronics America Inc., Milpitas, CA (US)

(72) Inventors: Damla Solmaz Acar, La Mesa, CA (US); Mihail Jefremow, Dusseldorf (DE); Jure Menart, Zurich (CH); Pooja Agrawal, Milpitas, CA (US); Amit Bavisi, Saratoga, CA (US); Gustavo James Mehas, Mercer Island, WA (US)

(73) Assignee: Renesas Electronics America Inc., Milpitas, CA (US)

(*) Notice: Subject to any disclaimer, the term of this patent is extended or adjusted under 35 U.S.C. 154(b) by 33 days.

(21) Appl. No.: 18/320,570

(22) Filed: May 19, 2023

(65) Prior Publication Data

US 2023/0388174 A1 Nov. 30, 2023

Related U.S. Application Data

(60) Provisional application No. 63/345,085, filed on May 24, 2022.

(51) Int. Cl.
*H04L 1/02* (2006.01)
*H04B 5/79* (2024.01)
*H04L 27/36* (2006.01)
*H04B 5/24* (2024.01)

(52) U.S. Cl.
CPC .......... *H04L 27/365* (2013.01); *H04B 5/79* (2024.01); *H04B 5/24* (2024.01)

(58) Field of Classification Search
CPC ........ H04L 27/06; H04L 27/02; H04L 27/08; H04L 27/22; H04L 27/2039; H04L 27/3416; H04L 27/3411; H02J 50/80; H02J 50/10; H04B 1/0475; H04B 2002/0408; H04B 1/40; H04B 2201/70706
USPC .......................................... 375/298; 455/42
See application file for complete search history.

(56) References Cited

U.S. PATENT DOCUMENTS

| | | | | |
|---|---|---|---|---|
| 2008/0247033 A1* | 10/2008 | Buettgen | .................. | H03D 7/00 359/325 |
| 2008/0318620 A1* | 12/2008 | van Waasen | .......... | H04L 27/362 455/552.1 |
| 2014/0022334 A1* | 1/2014 | Lockhart | ............... | H04L 65/403 348/14.09 |
| 2016/0204823 A1* | 7/2016 | Lovberg | .................. | H04B 1/40 375/219 |
| 2017/0194991 A1* | 7/2017 | Chang | .................. | H04B 1/0475 |
| 2021/0314204 A1* | 10/2021 | Al-Qaq | .................... | H03D 5/00 |

* cited by examiner

*Primary Examiner* — Khai Tran
(74) *Attorney, Agent, or Firm* — SCULLY, SCOTT, MURPHY & PRESSER, P.C.

(57) ABSTRACT

Systems and methods for demodulating a signal is described. A device can receive a modulated signal that encodes data. The device can sample a voltage of the modulated signal to generate a plurality of samples in digital domain. The device can determine in-phase data and quadrature data of the plurality of samples. The device can determine amplitude data and phase data based on the in-phase data and the quadrature data. The device can decode the amplitude data and phase data into digital symbols that represent the data encoded in the modulated signal.

18 Claims, 6 Drawing Sheets

QUADRATURE COMMUNICATION FOR WIRELESS POWER TRANSFER

CROSS-REFERENCE TO RELATED APPLICATION

The present application claims the benefit of U.S. Patent Application No. 63/345,085, titled "QUADRATURE COMMUNICATION FOR WIRELESS POWER TRANSFER" and filed on May 24, 2022, which is hereby incorporated by reference in its entirety.

BACKGROUND

The present disclosure relates in general to apparatuses and methods for implementing quadrature communication in wireless power systems, particularly, using quadrature modulation and demodulation techniques to communicate messages between wireless power transmitters and receivers.

Wireless power system can include a transmitter having a transmission coil and a receiver having a receiver coil. In an aspect, the transmitter may be connected to a structure including a wireless charging region. In response to a device including the receiver being placed on the charging region, or in proximity to the charging region, the transmission coil and the receiver coil can be inductively coupled with one another to form a transformer that can facilitate inductive transfer of alternating current (AC) power. The transfer of AC power, from the transmitter to the receiver, can facilitate charging of a battery of the device including the receiver.

SUMMARY

In one embodiment, a method for communication in wireless power systems is generally described. The method can include receiving a modulated signal that encodes data. The method can further include sampling a voltage of the modulated signal to generate a plurality of samples in digital domain. The method can further include determining in-phase data and quadrature data of the plurality of samples. The method can further include determining amplitude data and phase data based on the in-phase data and the quadrature data. The method can further include decoding the amplitude data and phase data into digital symbols that represent data encoded in the modulated signal.

In one embodiment, an apparatus for communication in wireless power systems is generally described. The apparatus can include a resonant circuit including a capacitor and an inductor, an analog front end (AFE) and a controller. The AFE can be configured to measure a voltage across the capacitor. The voltage can be a voltage of a modulated signal received by the inductor. The AFE can be further configured to sample the voltage to generate a plurality of samples in digital domain. The controller can be configured to determine in-phase data and quadrature data of the plurality of samples. The controller can be further configured to determine amplitude data and phase data based on the in-phase data and the quadrature data. The controller can be further configured to decode the amplitude data and phase data into digital symbols that represent data encoded in the modulated signal.

In one embodiment, a semiconductor device for communication in wireless power systems is generally described. The semiconductor device can include a memory and a processor. The memory can be configured to store a lookup table. The processor can be configured to receive a plurality of digital samples of a voltage of a modulated signal. The processor can be further configured to determine in-phase data and quadrature data of the plurality of digital samples. The processor can be further configured to use the lookup table to determine amplitude data and phase data based on the in-phase data and the quadrature data. The processor can be further configured to decode the amplitude data and phase data into digital symbols that represent data encoded in the modulated signal.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
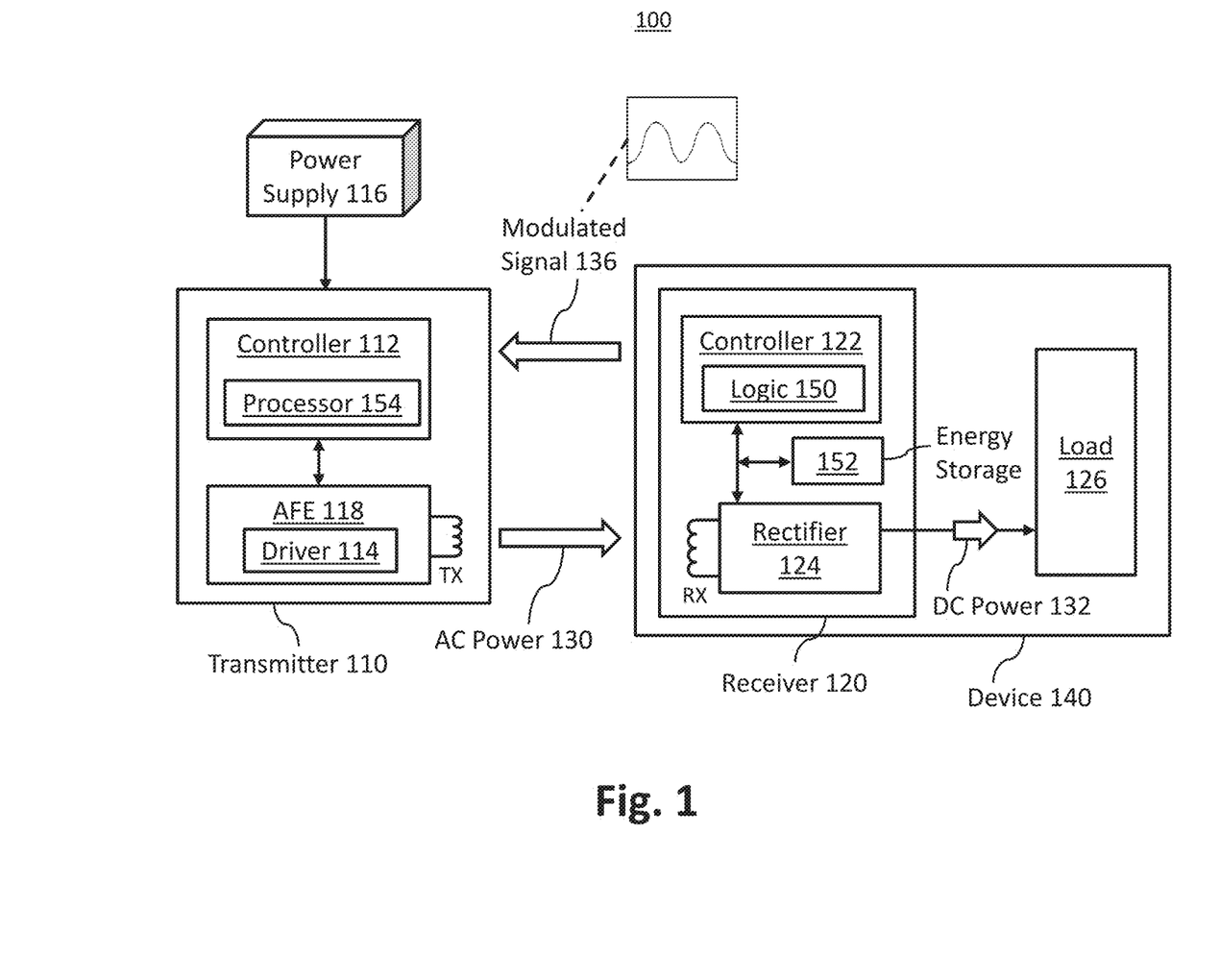
FIG. 1 is a block diagram of an example system for wireless power transfer according to an embodiment.

FIG. 1 is a diagram showing an example system 100 that implements wireless power transfer and communication according to an illustrative embodiment. System 100 can include a transmitter 110 and a receiver 120 that are configured to wirelessly transfer power and data therebetween via inductive coupling. While described herein as transmitter 110 and receiver 120, each of transmitter 110 and receiver 120 may be configured to both transmit and receive power or data therebetween via inductive coupling.

Transmitter 110 is configured to receive power from one or more power supplies and to transmit AC power 130 to receiver 120 wirelessly. For example, transmitter 110 may be configured for connection to a power supply 116 such as, e.g., an AC power supply or a DC power supply. Transmitter 110 can include a controller 112 and an analog front end (AFE) 118. AFE 118 can include various analog circuitry and integrated circuits (ICs), such as a driver circuit, or driver 114, configured drive a coil TX of transmitter 110.

Controller 112 can be configured to control and operate AFE 118. Controller 112 can include, for example, at least one processor (e.g., a processor 154), central processing unit (CPU), field-programmable gate array (FPGA) or any other circuitry that is configured to control and operate power driver 114. Controller 112 can further include at least one memory devices such as read only memory (ROM), random access memory (RAM), electrically-erasable programmable read only memory (EEPROM), or other types of memory devices. Controller 112 may include any other circuitry that is configured to control and operate various components of operations of transmitter 110. In an example embodiment, controller 112 can be configured to control power driver 114 to drive coil TX of to produce a magnetic field. Power driver 114 can be configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 can be configured to receive AC power 130 transmitted from transmitter 110 and to supply the power to one or more loads 126 or other components of a destination device 140. Load 126 may include, for example, a battery charger that is configured to charge a battery of the destination device 140, a DC-DC converter that is configured to supply power to a processor, a display, or other electronic components of the destination device 140, or any other load of the destination device 140. Destination device 140 may comprise, for example, a computing device, mobile device, mobile telephone, smart device, tablet, wearable device or any other electronic device that is configured to receive power wirelessly. In an illustrative embodiment, destination device 140 can include receiver 120. In other embodiments, receiver 120 may be separated from destination device 140 and connected to destination device 140 via a wire or other component that is configured to provide power to destination device 140.

Receiver 120 can include a controller 122 and a power rectifier 124. Controller 122 can include, for example, at least one processor, a CPU, an FPGA or any other circuitry that may be configured to control and operate power rectifier 124. Controller 122 can further include at least one memory devices such as ROMs, RAMs, EEPROMs, or other types of memory devices. Power rectifier 124 includes a coil RX and is configured to rectify power received via coil RX into a power type as needed for load 126. Power rectifier 124 is configured to rectify AC power received from coil RX into DC power 132 which may then be supplied to load 126. In one embodiment, power rectifier 124 can be a part of an AFE of receiver 120. Power rectifier 124 can facilitate driving coil RX to transmit signals encoding messages to coil TX of transmitter 110.

As an example, when receiver 120 is placed in proximity to transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126.

Transmitter 110 and receiver 120 are also configured to exchange information or data, e.g., messages, via the inductive coupling of power driver 114 and power rectifier 124. For example, before transmitter 110 begins transferring power to receiver 120, a power contract may be agreed upon and created between receiver 120 and transmitter 110. For example, receiver 120 may send modulated signal 136 or other data to transmitter 110 that indicate power transfer information such as, e.g., an amount of power to be transferred to receiver 120, commands to increase, decrease, or maintain a power level of AC power 130, commands to stop a power transfer, or other power transfer information. In another example, in response to receiver 120 being brought in proximity to transmitter 110, e.g., close enough such that a transformer may be formed by coil TX and coil RX to facilitate power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120. For example, if the power contract is already in place. Transmitter 110 and receiver 120 may transmit and receive communication packets, data or other information via the inductive coupling of coil TX and coil RX.

Receiver 120, under specific wireless protocols (e.g., Qi), can utilize load modulation (e.g., amplitude shift key (ASK) modulation) to encode information or data in a modulated signal 136. Modulated signal 136 can be an alternating current (AC) signal. External noise in system 100 can reduce signal-to-noise ratio (SNR) of modulated signal 136, which can increase a difficulty for transmitter 110 to decode the encoded information. Some receivers can manage load variations by using an onboard battery but the constant charging and discharging of the battery can decrease battery longevity. In an aspect, the SNR can be significantly reduced when power transfer is used to charge a battery in constant voltage mode because constant voltage mode can produce large impedance variations.

In an aspect, in order for transmitter 110 to decode modulated signal 136, internal and/or external analog circuitry in transmitter 110 can perform various signal conditioning (e.g., amplify, filter, convert, or other signal conditioning) on modulated signal 136 prior to transmitter 110 demodulating modulated signal 136. For example, analog circuitry for envelope tracking and detection, filtering, amplifying, and voltage controlled oscillators (VCOs), can be used on modulated signal 136 before modulated signal 136 is converted into digital domain (e.g., sampled as digital data) for decoding into bit symbols and packet detection processes. These analog circuitry for such signal conditioning can occupy relatively large areas on a circuit board. For wireless power transfer systems, it may be desirable to minimize a size and cost of a transmitter, thus the use of extensive analog circuitry is undesirable. Also, demodulation performed by a transmitter can be encumbered by the carrier signal in modulated signal 136 being a truncated sinusoid, which can approach a saw tooth waveform and making it difficult for the transmitter to decode.

In one embodiment, to address challenges such as demodulating signals having low SNR and reducing analog circuitry needed for various filtering, transmitter 110 and receiver 120 in system 100 can communicate using signals that are quadrature modulated using both amplitude and phase changes. The quadrature modulation described herein, which can be performed by transmitter 110 and/or receiver 120, can use impedance modulation to modify both amplitude and phase to encode information, and thus can encode more information when compared to conventional ASK and FSK techniques. Further, the quadrature demodulation schemes described herein may not need analog circuits such as envelope detection circuits and VCOs before processing in digital domain. Thus, the demodulation scheme can move the quadrature modulated signal into digital domain relatively quickly to reduce usage of analog circuitry and to improve success rate of demodulating signals with low SNR.

In one embodiment, controller 122 of receiver 120 can include control logic 150 configured to modulate one or more carried signals in quadrature space. The modulation in quadrature space allows receiver 120 to encode more than one messages or pieces of data in modulated signal 136. Control logic 150 can change an impedance on the RX coil to perform impedance modulation that changes the amplitude and phase of modulated signal 136 according to the impedance changes. The changes in amplitude and phase of modulated signal 136 can be used for encoding different messages. Control logic 150 can perform the impedance modulation by controlling an amount of energy being stored in an energy storage unit 152. Energy storage unit 152 can be, for example, a battery back or other forms of energy storage, and can include loads that can be switched for controlling an amount of stored energy. Further, since both amplitude and phase of modulated signal 136 are being changed, the impedance modulation can be performed in quadrature space. The impedance modulation in quadrature space allows simultaneous changes in amplitude and phase of a signal with respect to a reference. Hence, multiple bits can be encoded in a single waveform (e.g., modulated signal 136) that has both modified amplitude and phase, and the additional encoded information (e.g., more bits encoded) can increase a channel bandwidth.

In one embodiment, to demodulate the quadrature modulated signal (e.g., modulated signal 136) generated by receiver 120, transmitter 110 can use minimal amount of analog circuitry in AFE 118 to produce samples of modulated signal 136 and use a processor 154 to process the samples for demodulation. Processor 154 of controller 112 in transmitter 110 can be programmed or configured to perform a sequence of operations that perform various digital data processing operations in digital domain to identify in-phase and quadrature components of modulated signal 136, and extract amplitude and phase information of the in-phase and quadrature components. The extracted amplitude and phase information can be used for decoding information that are encoded in modulated signal 136. By converting modulated signal 136 into digital domain sooner, minimal analog circuitry is needed and the digitally extracted amplitude and phase information can be used for performing different types of analysis that may not be performed using analog circuits. By way of example, a processor can use the amplitude and phase information extracted in digital domain to decode information encoded in a low SNR signal. External conventional analog filtering techniques are limited in the amount of filtering they can apply using passive components before an amplifier is required to reduce the signal impedance. Digital techniques have no such limitations and are therefore superior in cases of low SNR. In addition, conventional analog filtering techniques are causal in nature, while digital techniques can use non-causal filters resulting in superior filtering efficacy.

Figure 2A:
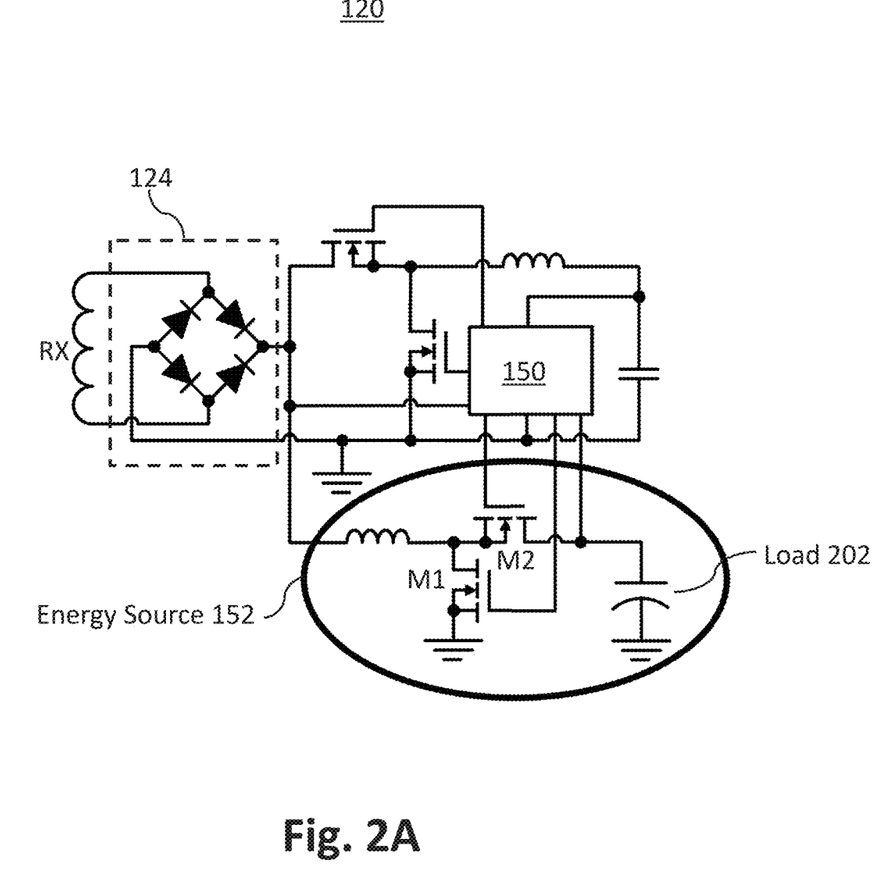
FIG. 2A is a circuit diagram illustrating details of an example receiver that can implement quadrature communication for wireless power transfer in one embodiment.

FIG. 2A is a circuit diagram illustrating details of an example receiver that can implement quadrature communication for wireless power transfer in one embodiment. In an embodiment shown in FIG. 2A, a load 202 can be connected to energy storage unit 152 in receiver 120. In one embodiment, load 202 can be a capacitor. Load 202 can be an active load for temporarily displacing energy from energy storage unit 152 to create a quadrature signal. In one embodiment, energy storage unit 152 can be a battery of receiver 120. Controller 122 (in FIG. 1) can implement control logic 150 to change an amount of energy stored in energy storage unit 152 by connecting and disconnecting load 202 via switches, such as metal-oxide-semiconductor field-effect transistor (MOSFETs) M1 and M2.

Control logic 150 can switch load 202 in or out of the circuit shown in FIG. 2A to decrease or increase energy being stored in energy storage unit 152, respectively. The decrease or increase of energy being stored in energy storage unit 152 can change an impedance on the RX coil. Thus, control logic 150 can change the impedance on the RX coil to perform impedance modulation. The amplitude and phase of modulated signal 136 can change according to the impedance changes. The changes in amplitude and phase of modulated signal 136 can be used for encoding different messages. Further, since both amplitude and phase of modulated signal 136 are being changed, the impedance modulation can be performed in quadrature space. Modulation in quadrature space allows simultaneous changes in amplitude and phase of a signal with respect to a reference. Hence, multiple bits can be encoded in a single waveform that has both modified amplitude and phase.

Figure 2B:
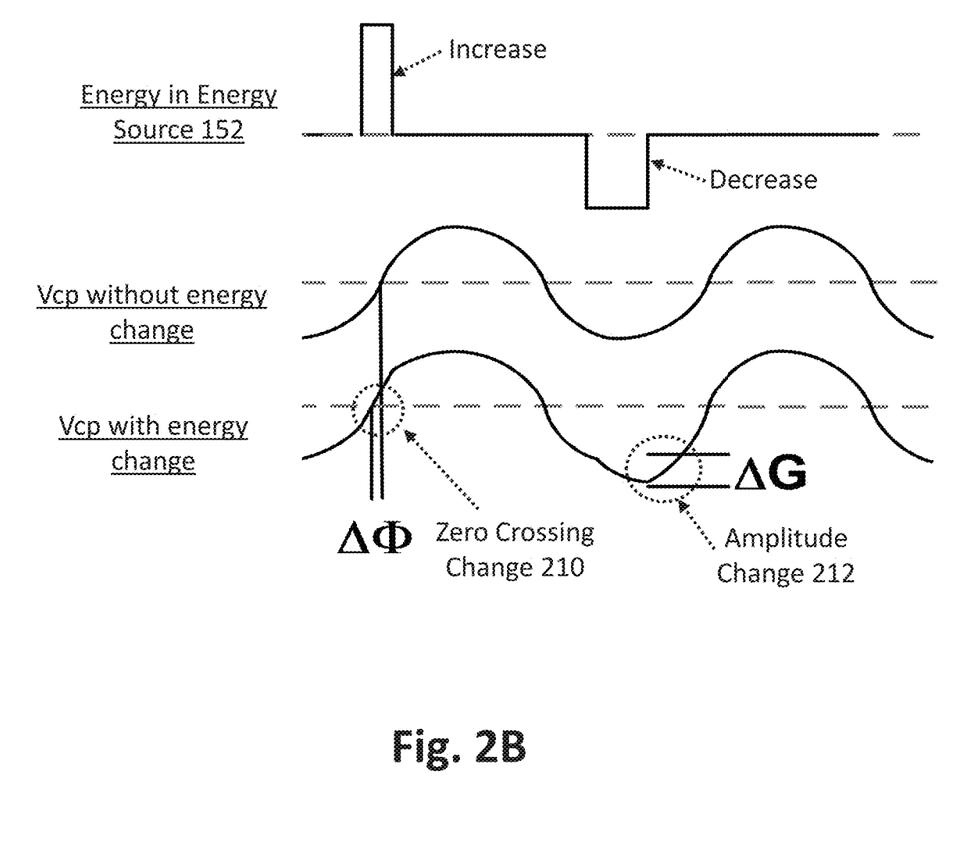
FIG. 2B is a diagram illustrating signals associated with an implementation of the example receiver shown in FIG. 2A in one embodiment.

Referring to FIG. 2B, example waveforms of a voltage Vcp are shown. Vcp can be an AC voltage measured across a capacitor connected to the RX coil in series (e.g., forming a LC resonant circuit). The impedance modulation performed by control logic 150 can cause changes to both amplitude and phase of Vcp, and these changes to Vcp can change amplitude and phase of modulated signal 136 as well. In the example shown in FIG. 2B, in response to an increase in energy stored in energy storage unit 152, an amplitude of Vcp can increase as well and the increased amplitude can cause a phase change $\Delta\Phi$. Phase change $\Delta\Phi$ can be indicated by a zero crossing change 210 (e.g., the zero crossing happens earlier in time). Further, in response to a decrease in energy stored in energy storage unit 152, an amplitude of Vcp can decrease as indicated by amplitude change $\Delta G$, and amplitude change $\Delta G$ can cause another phase change. Thus, control logic 150 can control an amount of energy change in energy storage unit 152 to control both amplitude and phase changes at different instances of Vcp. The changes in both amplitude and phase of Vcp can allow receiver 120 to encode different information, messages, and data in the same waveform (e.g., modulated signal 136). In one or more embodiments, control logic 150 can perform impedance modulation via one or more of 1) passive components (e.g., resistors, capacitors, inductors and the like), 2) semi-active components (e.g., diodes and their variations), and 3) active solution such as switch-based or transistor-based impedances that can replicate any impedance characteristic needed).

Figure 3A:
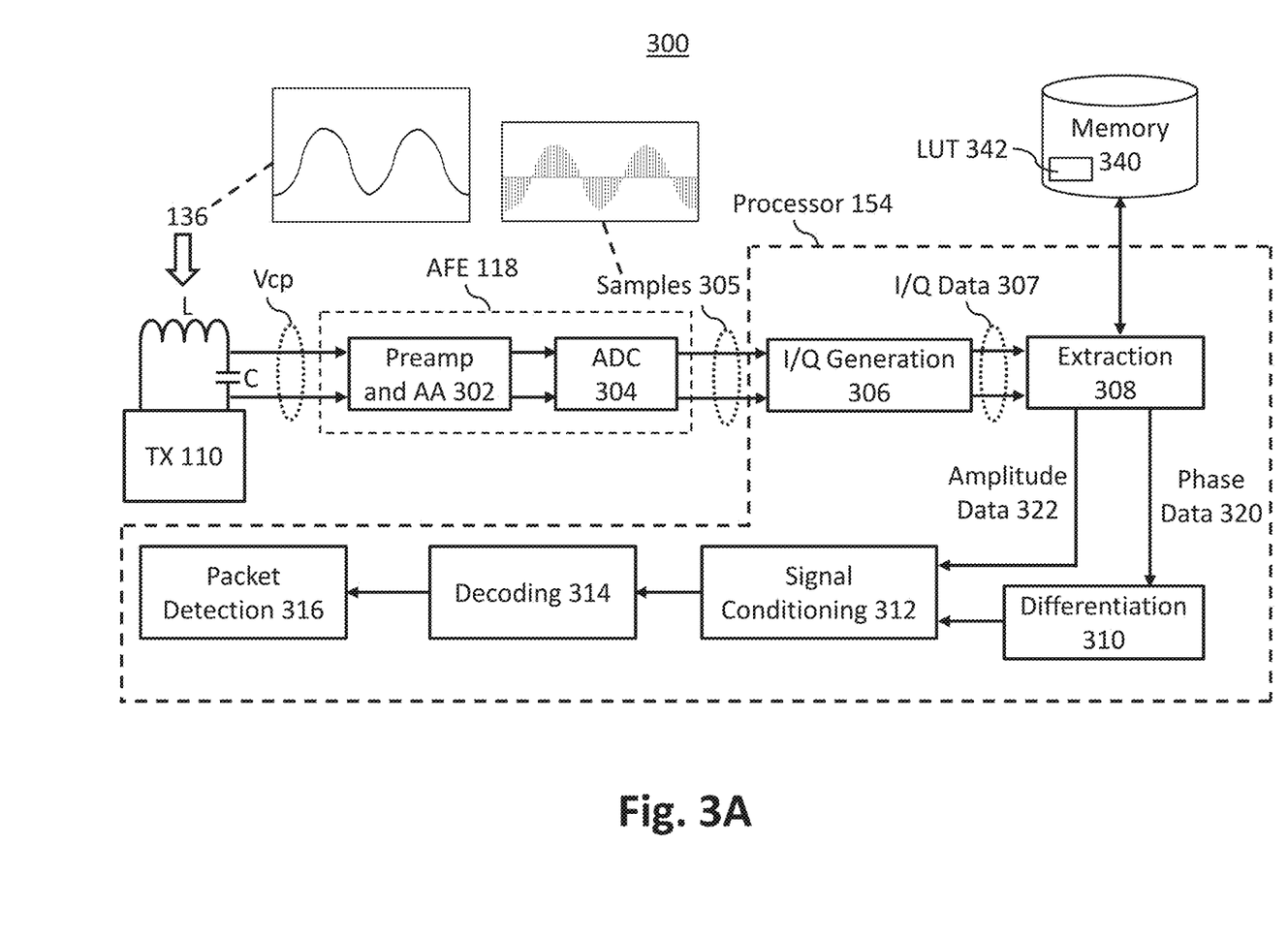
FIG. 3A is a diagram illustrating details of an example transmitter that can implement quadrature communication for wireless power transfer in one embodiment.

FIG. 3A is a diagram illustrating details of a demodulation that can be performed by a transmitter to implement quadrature communication for wireless power transfer in one embodiment. In one embodiment, transmitter 110 and/or receiver 120 in FIG. 1 can be configured to perform a quadrature demodulation 300 shown in FIG. 3A. Quadrature demodulation 300 shown in FIG. 3A can be implemented by hardware, software, or a combination of hardware and software.

In one embodiment, an inductor L (e.g., TX coil in FIG. 1) can receive modulated signal 136 from another device, such as receiver 120 shown in FIG. 1. AFE 118 of transmitter 110 can measure an AC voltage of modulated signal 136, denoted as Vcp (which can be same as Vcp shown in FIG. 2B), across a capacitor connected to inductor L in series. AFE 118 can include a preamplifier and anti-aliasing filter ("Preamp and AA") circuit 302 configured to receive Vcp. Preamp and AA circuit 302 can convert Vcp into a stronger signal and filter any signal that may be outside of the target signal bandwidth (e.g., perform anti-aliasing).

In one embodiment, prior to inductor L receiving modulated signal 136, inductor L can receive another signal encoding a message that indicates a next signal (e.g., modulated signal 136) being received by inductor L will be a quadrature modulated signal. In response to receiving the message indicating the next received message will be a quadrature modulated signal, controller 112 or processor 154 can activate components that facilitate quadrature demodulation 300 and redirect signal paths or traces to the activated components. By way of example, in response to receiving the message, controller 112 can deactivate or disconnect an envelope detection circuit, or specific analog circuitry in AFE 118 such as a VCO, and enable a signal path to allow preamp and AA circuit 302 to receive Vcp from capacitor C.

An output of preamp and AA circuit 302 can be provided to an analog-to-digital converter (ADC) 304 in AFE 118. ADC 304 can sample Vcp to convert Vcp into a plurality of samples 305 in digital domain (e.g., digital samples). In one embodiment, ADC 304 can be a relatively fast ADC, such as being configured to sample more than ten megasamples per second (MSPS). ADC 304 being a fast ADC can oversample Vcp, such as sampling Vcp at a sampling frequency significantly higher than the Nyquist rate (e.g., Nyquist rate being twice the bandwidth) of Vcp. Oversampling Vcp can generate relatively more individual samples in samples 305, thus improving a resolution of samples 305. In one embodiment, Vcp can be measured by AFE 118 at a capacitor-inductor node with respect to ground or differentially.

ADC 304 can output samples 305 to processor 154, where processor 154 can perform an I/Q generation 306 on samples 305. In one embodiment, I/Q generation 306 (or I/Q decomposition) can be a program code executable by processor 154 to identify and output in-phase (I) and quadrature (Q) components of samples 305 as I/Q data 307. In one embodiment, processor 154 can implement a digital I/Q generator to perform I/Q generation 306. Each piece of I/Q data 307 can indicate an I component and a Q component corresponding to a portion of samples 305. Further, each piece of I/Q data 307 can correspond to respective amplitude and phase values. By performing I/Q decomposition in digital domain, processor 154 can provide flexibility to the design and adaptability of different in-band noise conditions through different filtering and signal combining options by continuous feedback. Therefore, noise issues can be resolved with more flexibility in digital domain when compared to traditional systems that utilizes techniques, such as using parity bits, that does not actually handle the noise but rejects packets based on parity checks after the noise caused incorrect decodes.

Processor 154 can perform an extraction 308 based on I/Q data 307 to extract amplitude and phase information of the I and Q components of samples 305. Amplitude information extracted by extraction 308 can be digital data labeled as amplitude data 322 and phase information extracted by extraction 308 can be digital data labeled as phase data 320. Amplitude data 322 can include first amplitude information of the I component of samples 305 and second amplitude information of the Q component of samples 305. Phase data 320 can include first phase information of the I component of samples 305 and second phase information of the Q component of samples 305. Amplitude data 322 can include the different amplitudes that are present in each one of the I and Q components of samples 305. Phase data 320 can include the different phases that are present in each one of the I and Q components of samples 305.

In one embodiment, to perform extraction 308, processor 154 can use a lookup table (LUT) 342 to identify amplitude and phase values associated with, or mapped to, each piece of I/Q data 307 and extract the identified amplitude and phase values. LUT 342 can be stored in a memory 340, where memory 340 can be a part of controller 112 (see FIG. 1) or processor 154. LUT 342 can include mappings between different I and Q component values and different amplitude and phase values.

Processor 154 can perform signal conditioning on amplitude data 322 and phase data 320. In one embodiment, processor 154 can perform a differentiation on phase data 320 prior to performing signal conditioning 314 on phase data 320. In one embodiment, the differentiation can be implemented by a differentiator that generates a derivative or a differential of phase data 320. Processor 154 can perform decoding 314 to decode amplitude data 322 and phase data 320 (or differential of phase data 320) into digital symbols, bits, or packets, that can be subject to a packet detection 316. Under packet detection 316, processor 154 can identify portions of data encoded in modulated signal 136 such as heading, payload, or other portions, to decode information and messages encoded in modulated signal 136.

As receiver 120 send modulated signal 136 to transmitter 110, SNR of the channel being used for the communication can be poor because receiver 120 can reflect noise. This reflected noise can be resistive in nature and thus corrupts the magnitude portion of modulated signal 136 while the phase portion of modulated signal 136 can provide enough SNR for transmitter 110 to demodulate. Hence, it is difficult to perform traditional amplitude demodulation with the corrupted magnitude portion, but quadrature modulation can allow transmitter 110 to use the phase portion to demodulate the message from receiver 120. In some instances, phase modulation can become difficult because of the large resonant energy in the resonant tank of transmitter 110. This resonant energy needs to be moved to a different phase, which may be a difficult task, and the failure to move this resonant energy can cause smaller phase signals and lower phase SNR. Therefore, quadrature modulation can reinforce the signal being communicated such that the modulation signal can be demodulated with quadrature demodulation in cases where amplitude demodulation or phase demodulation is not feasible.

Figure 3B:
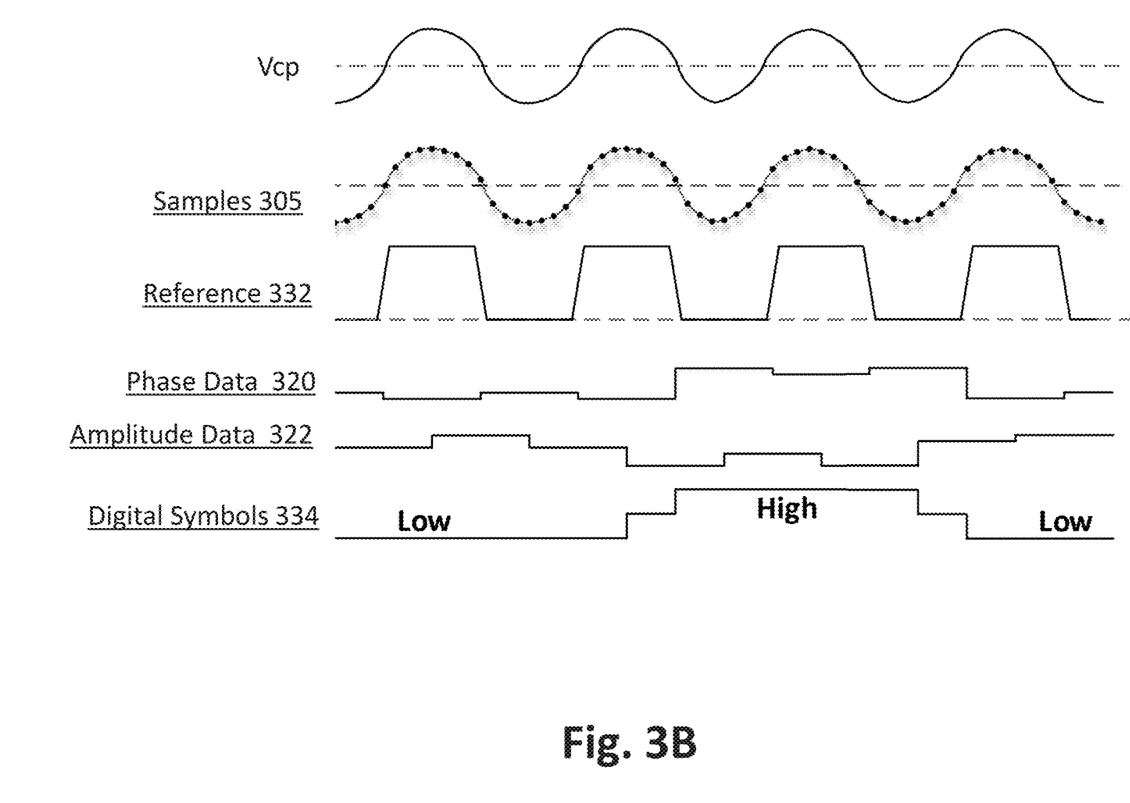
FIG. 3B is a diagram illustrating signals associated with an implementation of the example transmitter shown in FIG. 3A in one embodiment.

Referring to FIG. 3B, example waveforms of voltage Vcp and various signals associated with quadrature demodulation 300 in FIG. 3A are shown. Vcp can be an AC voltage measured across capacitor C in FIG. 3A. Vcp can be inputted into ADC 304 and ADC 304 can sample Vcp to produce samples 305, where samples 305 can be digital samples. I/Q generation 306 performed by processor 154 can output I and Q components of samples 305. Processor 154 can perform extraction 308 to compare the I and Q components with a reference 332. In one embodiment, reference 332 can be stored in memory 340 as values or entries of LUT 342. Extraction 308 can output a result of the comparison as phase data 320 and amplitude data 322. Following signal conditioning 312, processor 154 can perform decoding 314 to decode phase data 320 and amplitude data 322 to generate digital symbols 334. Processor 154 can perform packet detection 316 on digital symbols 334 to identify or detect various information, such as heading, payload, or other portions of a packet that may include information being conveyed by receiver 120.

Wireless power communication requires good sensitivity and noise rejection in its ASK demodulators or detectors, and in particular good rejection of in-band noise. This in-band noise can be caused by, for example, frequency components of in-band signals from load 126 during communication from receiver 120 to transmitter 110. This in-band noise can be superimposed upon the communication from receiver 120 to transmitter 110. A combination of at least the usage of a fast ADC (e.g., ADC 304), I/Q generation 306 in digital domain, amplitude and phase extraction using LUT 342, and other operations in quadrature demodulation 300, allows transmitter 110 to reject the in-band system noise and decode the wireless power packet structures without a need for traditional data recovery techniques such as parity bits or hamming codes.

Figure 4:
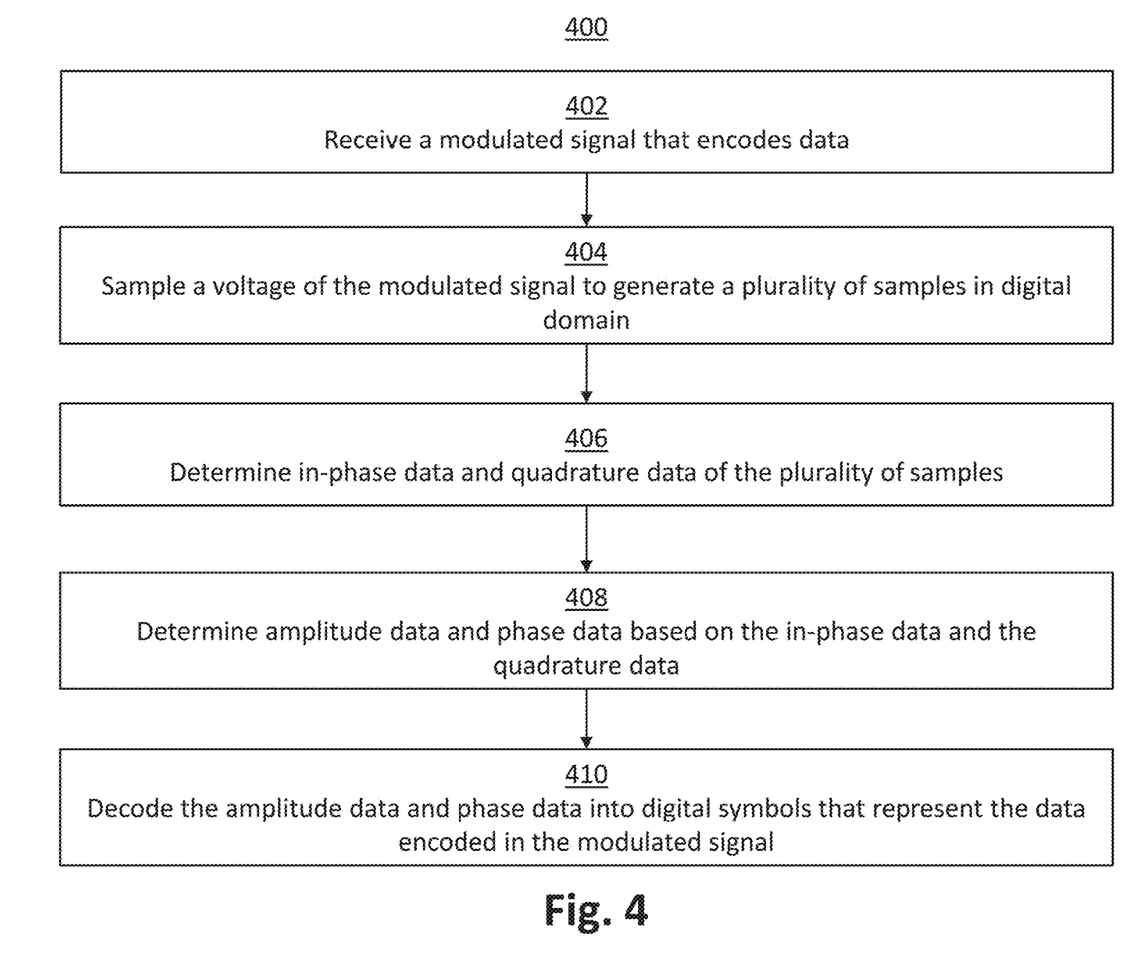
FIG. 4 illustrates a process relating to quadrature communication for wireless power transfer in one embodiment.

FIG. 4 illustrates a process relating to quadrature communication for wireless power transfer in one embodiment. Process 400 can include one or more operations, actions, or functions as illustrated by one or more of blocks 402, 404, 406, 408 and/or 410. Although illustrated as discrete blocks, various blocks may be divided into additional blocks, combined into fewer blocks, eliminated, performed in different order, or performed in parallel, depending on the desired implementation.

Process 400 can be performed by transmitter 110 and/or receiver 120 shown in FIG. 1. Process 400 can begin at block 402. At block 402, a device (e.g., a transmitter or a receiver) can receive a modulated signal that encodes data. In one embodiment, the modulated signal can be amplitude modulated and phase modulated in the quadrature space. In one embodiment, the modulated signal can be received by a wireless power transmitter from a wireless power receiver. In one embodiment, the device can receive a message prior to receiving the modulated signal, where the received message can indicate that the modulated signal is amplitude modulated and phase modulated in the quadrature space.

Process 400 can proceed from block 402 to block 404. At block 404, the device can sample a voltage of the modulated signal to generate a plurality of samples in digital domain. In one embodiment, the device can oversample the modulated signal. Process 400 can proceed from block 404 to block 406. At block 406, the device can determine in-phase data and quadrature data of the plurality of samples.

Process 400 can proceed from block 406 to block 408. At block 408, the device can determine amplitude data and phase data based on the in-phase data and the quadrature data. In one embodiment, the device can use a lookup table to determine the amplitude data and the phase data, where the lookup table can map different in-phase data and different quadrature data to different amplitude values and different phase values. Process 400 can proceed from block 408 to block 410. At block 410, the device can decode the amplitude data and phase data into digital symbols that represent the data encoded in the modulated signal.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for communication in wireless power systems, the method comprising:
   receiving a message, wherein the received message indicates that a modulated signal is amplitude modulated and phase modulated in quadrature space;
   receiving the modulated signal that encodes data;
   sampling a voltage of the modulated signal to generate a plurality of samples in digital domain;
   determining in-phase data and quadrature data of the plurality of samples;
   determining amplitude data and phase data based on the in-phase data and the quadrature data; and
   decoding the amplitude data and phase data into digital symbols that represent the data encoded in the modulated signal.

2. The method of claim 1, wherein the modulated signal is amplitude modulated and phase modulated in quadrature space.

3. The method of claim 1, wherein receiving the modulated signal comprises receiving the modulated signal at a wireless power transmitter from a wireless power receiver.

4. The method of claim 1, wherein sampling the modulated signal comprises oversampling the modulated signal.

5. The method of claim 1, wherein determining the amplitude data and the phase data comprises using a lookup table that maps different in-phase data and different quadrature data to different amplitude values and different phase values.

6. An apparatus comprising:
   a resonant circuit including a capacitor and an inductor;

an analog front end (AFE) configured to:
    measure a voltage across the capacitor, wherein the voltage is a voltage of a modulated signal received by the inductor; and
    sample the voltage to generate a plurality of samples in digital domain;
a controller configured to:
    determine in-phase data and quadrature data of the plurality of samples;
    determine amplitude data and phase data based on the in-phase data and the quadrature data; and
    decode the amplitude data and phase data into digital symbols that represent data encoded in the modulated signal.

7. The apparatus of claim 6, wherein the modulated signal is amplitude modulated and phase modulated in quadrature space.

8. The apparatus of claim 6, wherein:
the resonant circuit, the AFE and the controller are parts of a wireless power transmitter; and
the modulated signal is received from a wireless power receiver.

9. The apparatus of claim 6, wherein the AFE comprises an analog-to-digital converter (ADC) configured to sample the voltage.

10. The apparatus of claim 9, wherein the ADC is configured to oversample the voltage.

11. The apparatus of claim 6, wherein the controller is configured to use a lookup table that maps different in-phase data and different quadrature data to different amplitude values and different phase values to determine the amplitude data and the phase data.

12. The apparatus of claim 11, further comprising a memory configured to store the lookup table.

13. The apparatus of claim 6, wherein the controller is configured to receive a message prior to a receipt of the modulated signal, wherein the received message indicates that the modulated signal is amplitude modulated and phase modulated in quadrature space.

14. A semiconductor device comprising:
a memory configured to store a lookup table;
a processor configured to:
    receive a message, wherein the received message indicates that a modulated signal is amplitude modulated and phase modulated in quadrature space;
    receive a plurality of digital samples of a voltage of the modulated signal; and
    determine in-phase data and quadrature data of the plurality of digital samples;
    use the lookup table to determine amplitude data and phase data based on the in-phase data and the quadrature data; and
    decode the amplitude data and phase data into digital symbols that represent data encoded in the modulated signal.

15. The semiconductor device of claim 14, wherein the processor is configured to receive the plurality of digital samples from an analog-digital-converter (ADC).

16. The semiconductor device of claim 14, wherein the modulated signal is amplitude modulated and phase modulated in quadrature space.

17. The semiconductor device of claim 14, wherein;
the processor and the memory are parts of a wireless power transmitter; and
the modulated signal is received from a wireless power receiver.

18. The semiconductor device of claim 14, wherein the processor is configured to use a lookup table that maps different in-phase data and different quadrature data to different amplitude values and different phase values to determine the amplitude data and the phase data.

\* \* \* \* \*